United States Patent [19]

Facq et al.

[11] Patent Number: 5,028,118

[45] Date of Patent: Jul. 2, 1991

[54] DEVICE FOR THE CONTROL AND ADJUSTMENT OF THE MODAL ALIGNMENT OF OPTICAL FIBERS

[75] Inventors: Paul Facq, Panazol; Gilles Fressy, Perros-Guirec; Dominique Pagnoux; Jean-Marc Blondy, both of Limoges; Jean-Francois Seignole, Razac sur L'Isle, all of France

[73] Assignee: Centre National d'Etudes des Telecommunications, Issy les Moulineaux, France

[21] Appl. No.: 480,106

[22] Filed: Feb. 14, 1990

[30] Foreign Application Priority Data

Feb. 21, 1989 [FR] France ................... 89 02221

[51] Int. Cl.$^5$ .................................. G02B 6/02
[52] U.S. Cl. ......................... 350/96.29; 350/96.15
[58] Field of Search .............. 372/19, 18; 350/96.15, 350/96.29

[56] References Cited

U.S. PATENT DOCUMENTS 4,797,893 1/1989 Dixon .................................. 372/19

FOREIGN PATENT DOCUMENTS 2590685 5/1987 France .
60-107603 6/1985 Japan .

OTHER PUBLICATIONS

Millar et al.; "Cladding Alignment of Butted Optical Fibers Using a Diffraction Alignment Device (DAD and its Application to Mode-Spot Concentricity-Error Measurement"; Journal of Lightwave Technology, vol. LT-3, No. 4 Aug. 1985, pp. 868-874.

Facq et al., "Tunable Single-Mode Excitation in Multi-mode Fibers"; Electronics Letters, vol. 20, No. 15, Jul. 19, 1984; pp. 613-614.

Primary Examiner—John D. Lee
Assistant Examiner—John Ngo
Attorney, Agent, or Firm—Hayes, Soloway, Hennessey & Hage

[57] ABSTRACT

A device for the control and adjustment of the modal alignment of optical fibers is described. The device includes at least one laser (20) delivering an electromagnetic beam, and at least one mode selector (26) suitable for acting on the beam so as to produce a TEM1, j−1 type modal structure, the modal structure having an axis of symmetry (15). Also included in the device are a marker for marking at this axis of symmetry (15) orientation variations around an axis (RR1); an introducer for introducing the electromagnetic beam into an optical fiber (10); and a measurer (36) for measuring luminous power. The device is particularly adapted for the adjustment of the alignment of optical fibers as regards their connection and for centering an optical fiber in a plug connector.

14 Claims, 7 Drawing Sheets

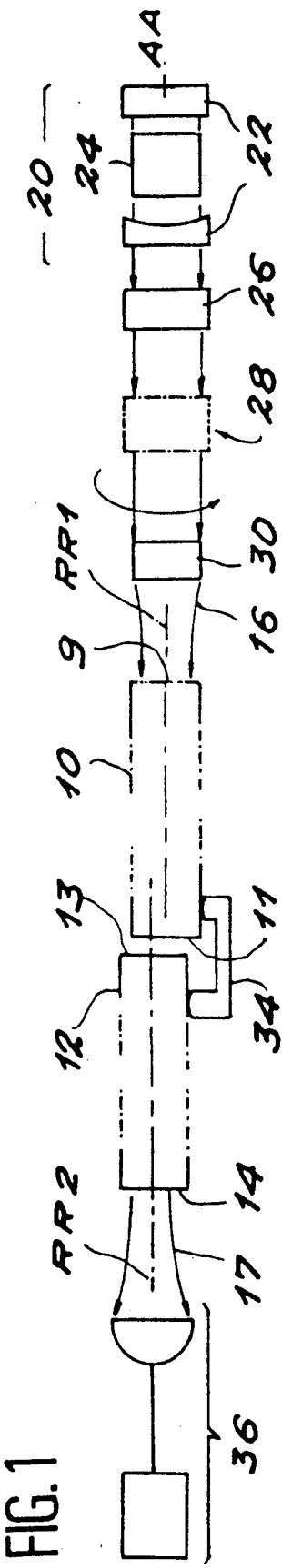
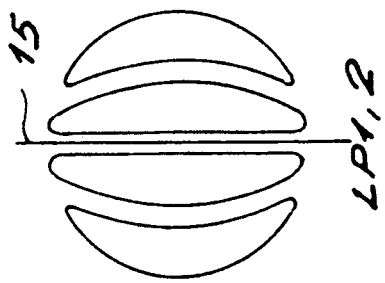
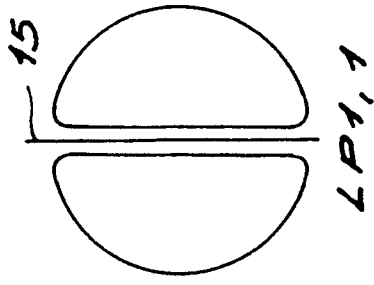

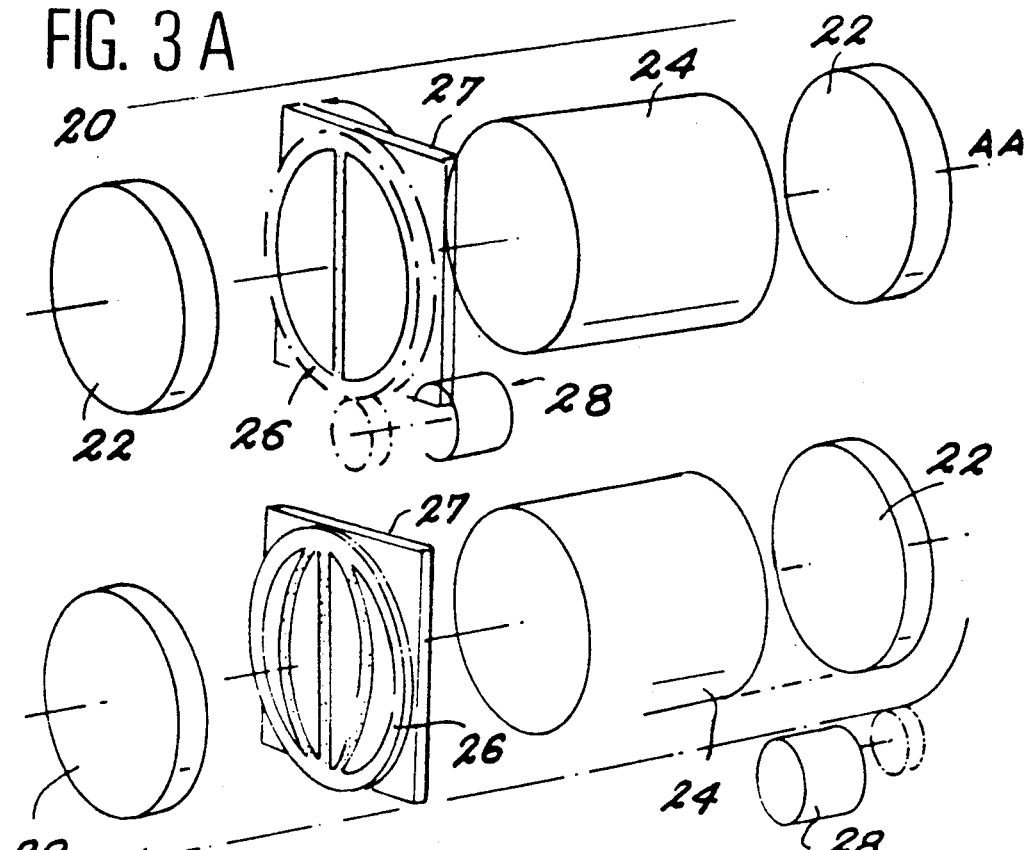
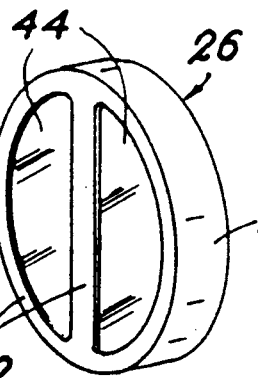
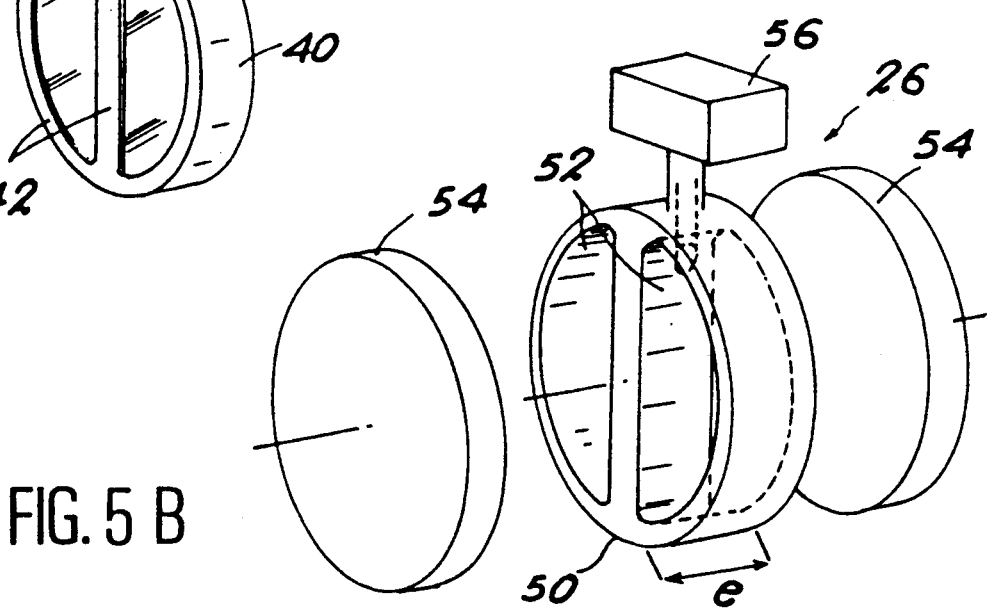

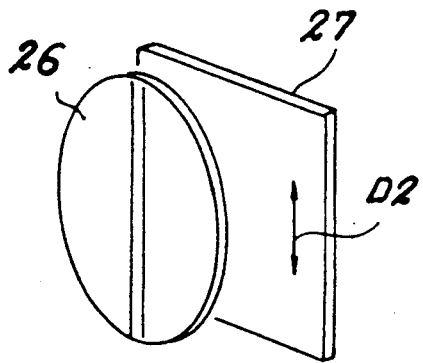
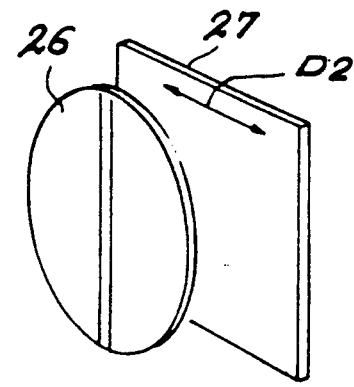
FIG. 4 A  FIG. 4 B
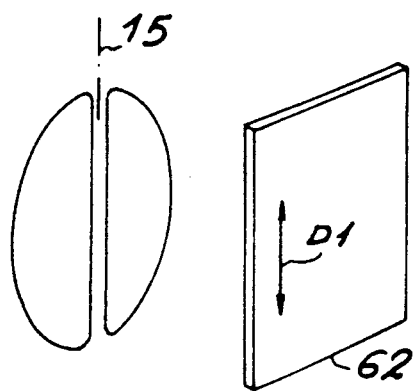
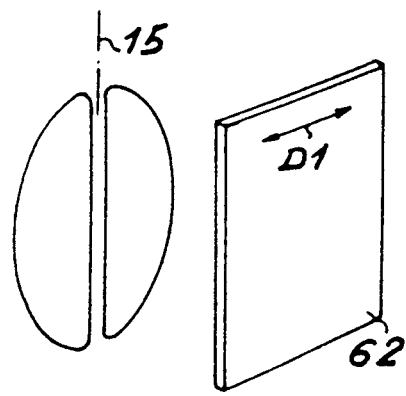
FIG. 6 B  FIG. 6 C
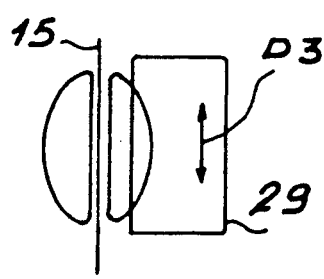
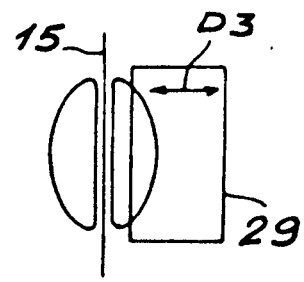
FIG. 9 B  FIG. 9 C

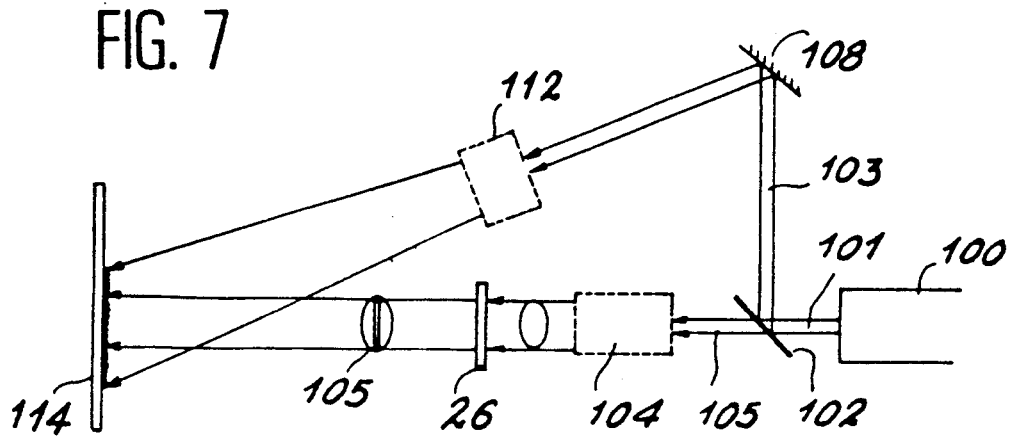
FIG. 7
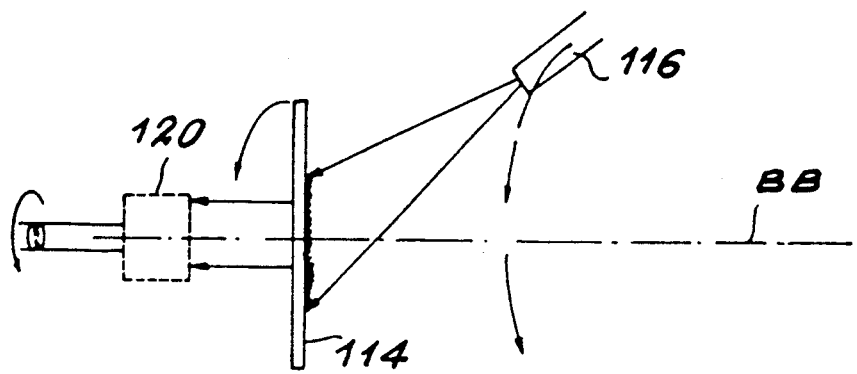
FIG. 8
FIG. 9A
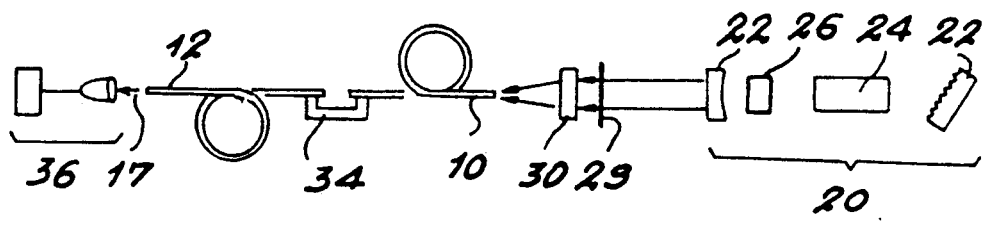

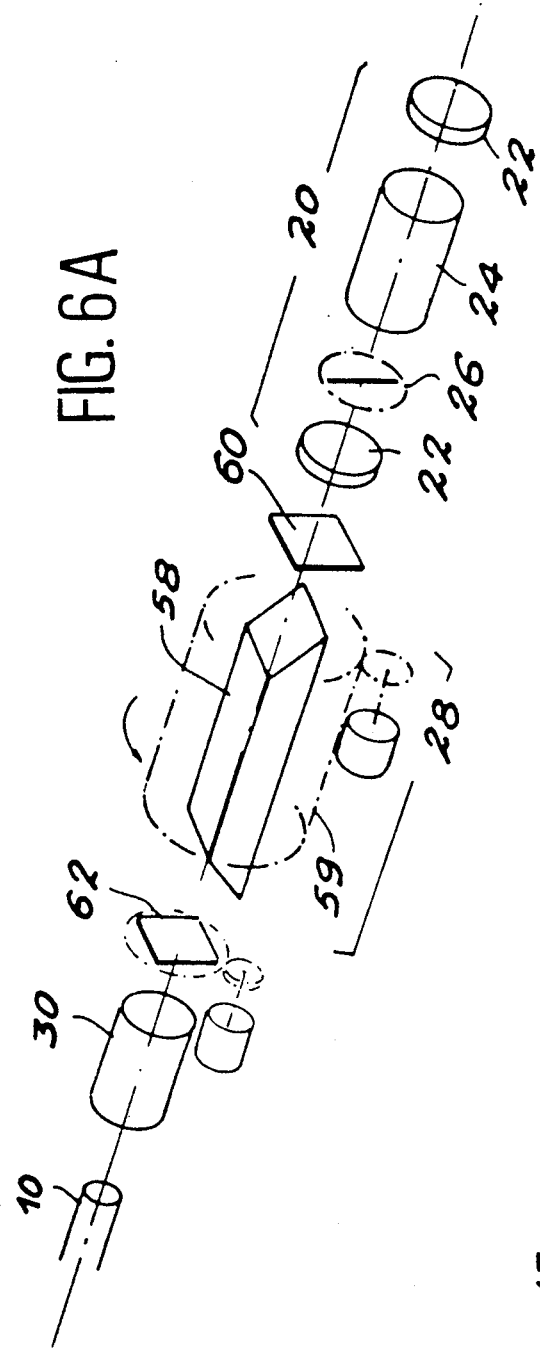
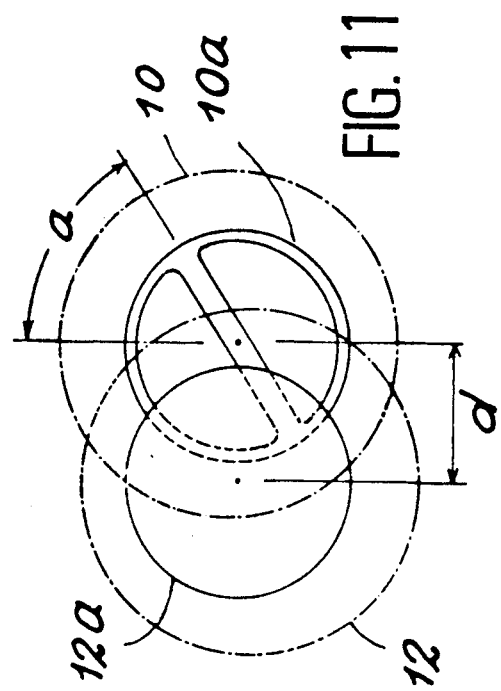
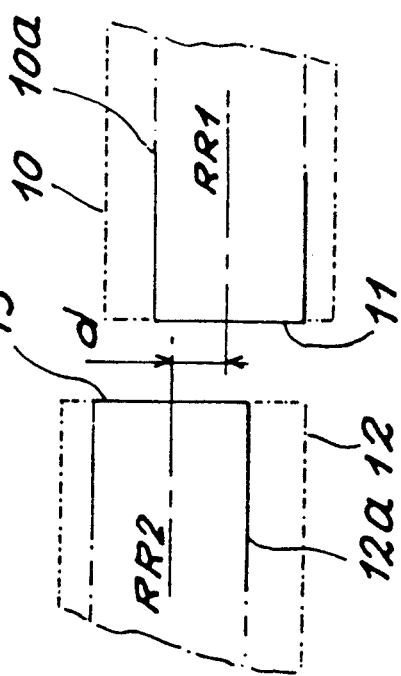

DEVICE FOR THE CONTROL AND ADJUSTMENT OF THE MODAL ALIGNMENT OF OPTICAL FIBERS

FIELD OF THE INVENTION

The object of the present invention is to provide a device to control and adjust the modal alignment of optical fibers. In particular, it is applicable to the control and adjustment of the modal alignment of cores with two unimodal or multimodal optical fibers as regards their connection and to the centering of the core of a fiber inside a plug connection.

BACKGROUND OF THE INVENTION

The slightest amount of misalignment between two optical fibers at their connection point generates losses on the signal carried. Consequently, it is extremely important to control the state of alignment and if necessary to be able to adjust it. The core of fibers may be moved out of center with respect to the cladding and accordingly it is not merely sufficient to align claddings with a V-shaped part, for example. Various known control measures have been effected so as to improve the alignment of fibers and reduce losses.

There currently exists a method consisting of measuring the luminous power transmitted by the fibers. Mechanical action is effected on the fibers at the connection point so as to render this luminous power maximum. This technique has the drawback of being sensitive to fluctuations of the luminous power delivered by the source, to possible sensitivity drifts of the detector used for measuring, as well as to the modal distribution of the energy in fibers as regards multimodal fibers.

Another known technique consists of measuring the power diffused at the connection point; by mechanically acting on at least one of the fibers connected, this technique attempts to render this diffused light to a minimum. This technique has the drawback of requiring a decladding of the fibers or the use of claddings transparent to radiation. In addition, the connection parts need to have transparent zones to enable the measurement to be made.

Furthermore, these measurements intended for adjustment between fibers cannot be applied for the single control of a fixed connection, since they require mechanical action on at least one of the fibers so as to cause the transmitted luminous power to vary.

A correct modal alignment is also required when mounting an optical fiber inside a connection plug of the crimped straight plug type.

The operations for adjusting the position of the fiber inside the plug are usually complex and less precise. The tooling required for these operations is described, for example, in the assembly instructions for the PFO tooling set, reference F 780 111 000, and sold by the Radiall company.

The fiber crimped in the plug is mounted declad in a mobile terminal joining piece. The plug is fixed to a support, a panoramic sight being secured to said support.

So as to adjust the position of the fiber in the plug, the core of the fiber is made to coincide with a reticule situated inside the sight. This is a delicate procedure, the first operation consisting of positioning the reticule by means of a standard plug. Having positioned the reticule, the plug to be adjusted is mounted on the support and one extremity of the fiber is illuminated. By acting on the position of the joining piece, the image of the core of the fiber is superimposed on the reticule. Once the position is determined, the fiber is rendered immobile by glueing. The precision obtained by this adjustment is ±0.5 micrometers if the fiber is a monomode fiber.

SUMMARY OF THE INVENTION

The object of the present invention is to overcome these various drawbacks. In fact, when controlling or adjusting a connection, it is not necessary to declad the fibers; as for the connection elements, these can be opaque. The device of the invention makes it possible to adjust the alignment of the cores of fibers connected by connectors, as well as to evaluate the quality of alignment for fixed splices. It also makes it possible to dispense with offsetting the core in the cladding.

In addition, control of alignment by a device conforming to the invention is independent of any possible power injected; it is also independent of any modal fluctuations of usual sources.

Used to adjust the centering of a fiber in a connection plug, the device of the invention makes it possible to simplify the various adjustment operations so as to obtain greater precision.

More precisely, the present invention concerns a device to control and adjust the modal alignment of optical fibers. This device includes:

- at least one laser composed of a cavity having a longitudinal axis and delivering an electromagnetic beam,
- at least one mode selector suitable for acting on said beam so as to produce a TEM1,j−1 type modal structure with $1 \leq j \leq n$ where n is a maximum radial sequence of an optical fiber, this modal structure having an axis of symmetry,
- means to mark at this axis of symmetry orientation variations around an axis,
- means to introduce this electromagnetic beam into an optical fiber,
- luminous power measurement means.

BRIEF DESCRIPTION OF The DRAWINGS

The characteristics and advantages of the invention shall appear more readily from a reading of the following description, given by way of explanation and being in no way restrictive, with reference to the accompanying drawings in which:

FIG. 1 diagrammatically represents a device according to the invention,

FIG. 2A and 2B represent LP1,j type propagation mode transverse profiles for the various values of j, FIGS. 3A and 3B diagrammatically represent various embodiment variants of a mode selector used in a device conforming to the invention, FIGS. 4A and 4B diagrammatically represent two possible orientations of a polarizer integral with a mode selector, FIGS. 5A and 5B represent other embodiment variants of a mode selector used in a device conforming to the invention, FIGS. 6A to 6C diagrammatically represent a device conforming to the invention and including a Dove prism, as well as any possible orientations of a polarizer included in this device, FIG. 7 diagrammatically represents a device to record a hologram representing the mode LP11, FIG. 8 diagrammatically represents a device to place in rotation a restored mode LP11 by the illumination of a holographic recording, FIG. 9A diagrammatically represents a device of the invention using several wavelengths, FIGS. 9B and 9C diagrammatically represent the orientations of the polarization direction of a polarizer included in the device represented on FIG. 9A, FIG. 10 diagrammatically represents a longitudinal section of the first and second optical fibers at the connection point, FIG. 11 diagrammatically represents a cross section carried out at the admission side of the second fiber, FIG. 12 diagrammatically represents the variations of the luminous power transmitted by a second fiber according to the angle of rotation of the axis of symmetry at the selected mode LP1,j, FIG. 13 diagrammatically represents experimental results showing the variations of the modulation depth of the luminous power transmitted by the second fiber during the rotation of the modal structure introduced in a first fiber according to the axial misalignment between two fibers, FIG. 14 diagrammatically represents a device according to the invention applied to the centering of a fiber in a connection plug, FIG. 15 diagrammatically represents an embodiment variant of a device of the invention and applied to the centering of a fiber in a connection plug.

DETAILED DESCRIPTION OF THE PREFERRED EMBODIMENTS

Figure 12:
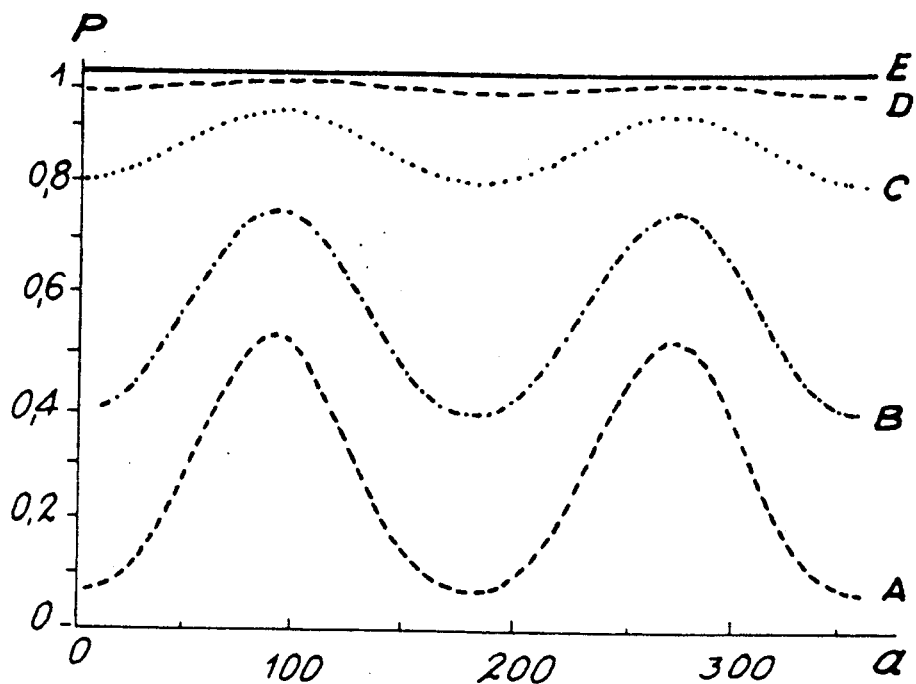

FIG. 1 diagrammatically represents a device according to the invention.

The luminous beam is delivered by a laser 20 composed of an optical cavity 22 (composed of at least two mirrors) and an amplifying medium 24. The optical cavity 22 has a longitudinal axis AA; the luminous beam 16 has a symmetry of revolutions around this axis AA.

The laser 20 may be a gas laser, the tube containing the gas being closed at one extremity by a sealed mirror and at the other by a transparent plate coated with bloomings. This laser may also be a solid laser whose amplifying material bar is cylindrical and provided with terminal faces exhibiting the symmetry of revolution around the axis AA. The laser may also be a liquid amplifier medium laser of the dye laser type. The distribution of population inversion in an amplifier medium 24 needs to exhibit a symmetry of revolution around the axis AA.

The beam 16 delivered by the laser 20 exhibits a gaussian transverse profile corresponding to the mode TEM0, 0 of the laser. A mode selector 26 is disposed so as that its action on the beam produces a modal structure TEM1,j−1. This modal structure TEM1,j−1 corresponds to a mode LP1,j, j being a whole number so that $1 \leq j \leq n$ where 1 represents the azimuthal sequence and n the maximum radial sequence of modes able to be guided into the fibers 10, 12 whose adjustment is to be verified.

FIG. 1 also shows that the mode selector is outside the optical cavity 22. But as shall be seen subsequently, it may also be placed inside the cavity 22.

The propagation mode LP1,1 is preferably selected, this mode being embodied relatively simply. This mode LP1,1 corresponds to a modal structure TEM1,0.

FIGS. 2A and 2B diagrammatically represent transverse profiles of various propagation modes LP1,j of an optical fiber; theses modes LP1,j correspond to modes TEM1,j−1 of the luminous beam. The following cases are represented: FIG. 2A, j=1; FIG. 2B, j=2.

The only propagation modes able to be used to adjust the alignment of the fibers 10, 12 are those of the type LP1,j. These modes have a single axis of symmetry as the electromagnetic field constituting them is nil. This axis of symmetry 15 is referred to the "modal axis" in the rest of this text.

A device according to the invention further includes, as shown on FIG. 1, means 28 suitable for marking at the modal axis 15 variations of orientation around an axis RR1 which is the axis of revolution of the core of the first fiber 10.

As shall be seen in more detail in the continuation of the description, these variations of orientation may be obtained by acting on the orientation of the modal structure by mechanical means, for example, or even by purely optical means by acting directly on the orientation of modes able to be guided by the fibers 10,12 whose adjustment is to be controlled.

Throughout the description, the modal axis 15 is used as a reference axis, as the modal structure introduced in the first fiber 10 also has an axis of symmetry corresponding to the modal axis 15. Similarly, the implementation means to produce the modal structure have an axis corresponding to the modal axis 15.

The beam 16 is introduced into the first fiber 10 via its admission side 9 by means of introduction means: the beam 16 is focussed by optical focussing means 30, such as a set of lenses.

The first optical fiber 10 is connected via its outgoing fiber 12. The fibers 10,12 are interconnected by a connection 34: the device of the invention makes it possible to control the adjustment between the cores of two fibers 10,12 at the level of this connection 34; they also make it possible to improve this adjustment. In other words, it makes it possible to merge at the connection the axes of revolution RR1 and RR2 of the cores of the first and second fibers 10, 12 respectively.

Means 36 for measuring luminous power measure the luminous power variations of the luminous beam 17 derived from the outgoing face 14 of the second optical fiber 12 during orientation variations of the modal axis 15.

FIGS. 3A and 3B diagrammatically represent embodiment means of the mode selector 26 placed inside the cavity of the laser. This type of embodiment is described in the article entitled "Tunable single-mode excitation in multimode fibers" by P. Facq and al featured in the Electronics Letters journal of the 19th July 1984, vol. 20, pages 613-614.

FIG. 3A diagrammatically represents a laser containing an intracavity mode selector. This first embodiment of the mode selector 26 consists of a wire stretched perpendicular to the longitudinal axis AA. This selector 26 embodies a mode TEM1,0 of the laser corresponding t the mode LP1,1 of the fibers 10,12.

In this embodiment example, the means 28 suitable for marking at the modal axis 15 variations of orientation around the axis of revolution RR1 of the core of the first fiber 10 consist of a support of the mode selector 26 suitable for placing the selector 26 in rotation. In this case, the laser shall be preferably selected so as to supply a polarized beam in a circular fashion. The orientation variations obtained here correspond to one rotation of the modal axis 15.

Equally, the stretched wire inside the cavity may be replaced by an engraving made on the internal face of one of the mirrors of the cavity. In this case, it is this mirror which is placed in rotation by the means 28 suitable for marking orientation variations.

FIG. 3B diagrammatically represents a second embodiment of a mode selector 26 embodying a mode TEM1,1 corresponding to the mode LP1,2 of the fiber. Engravings are embodied on a transparent circular pupil so as to obtain the zeros of the electromagnetic field constituting said mode.

In this example, the means 28 used to mark orientation variations at the modal axis 15 consist of a support of the laser 20 suitable for placing the laser in rotation and the mode selector 26 integral with the laser. The advantage of this embodiment method lies in the fact that the luminous power of the mode remains constant, independent of the polarization conditions of the beam.

In this embodiment, the electric power source (not shown) is connected to the laser 20 by revolving contacts (not shown).

For the first and second embodiments of a mode selector shown on FIGS. 3A and 3B, a rectilinear polarizer 27 is preferably rendered integral with the mode selector 26.

FIG. 4A diagrammatically represents a mode selector 26 and the rectilinear polarizer 27 integral with the latter. In this embodiment, the polarization direction D2 of the polarizer 27 is parallel to the modal axis 15. To achieve this, the direction D2 is parallel to the stretched wire constituting the mode selector 26 (in the case where the mode selector 26 is embodied from a pupil or an engraved mirror, the direction D2 is parallel to the central engraving).

FIG. 4B diagrammatically represents a mode selector 26 and the polarizer 27 integral with the latter. In this embodiment, the polarization direction D2 of the polarizer 27 is perpendicular to the modal axis 15; in other words, the direction D2 is perpendicular to the stretched wire constituting the mode selector 26.

FIGS. 5A and 5B diagrammatically represent variants for the embodiment of a mode selector 26 placed outside the cavity of the laser. When the selector is outside the cavity, it is possible to place on the path length of the luminous beam derived from the laser a lens making it possible to increase the diameter of the beams, and then an optical system rendering the emerging beam almost parallel.

The lens 30 (FIG. 1) makes it possible to then focus the modal structure in the first fiber 10.

FIG. 5A diagrammatically represents an embodiment variant of a mode selector 26 placed outside the cavity. In this case, the selector 26 consists of a homogeneous transparent plate 40 with parallel sides; one face 42 of the plate 40 is metallized so as to leave transparent on this face 42 a transverse profile roughly reproducing the profile of the selected mode LP1,j. A transparent dielectric layer is deposited on the various lobes left transparent of the face 42. Its thickness depends on the coated lobe so as to obtain the optical phase shifts corresponding to the selected mode LP1,j.

This figure shows a selector 26 embodying a mode LP1,1. The two spots of this mode are dephased by $\pi$.

FIG. 5B diagrammatically represents an exploded view of another embodiment of a mode selector 26. This type of embodiment is described in the article by P. Facq and al and entitled "Excitation of tubular modes in gradient multimode fibers" featured in the reports of the photon 80 conference held at Paris in October 1980.

This selector comprises an opaque plate 50 with a thickness e in which perforations 52 are made laying out the profile of the selected mode LP1,j. In the example shown, the profile of a mode LP1, 1 is laid out.

The plate 50 is crimped between two plates with parallel transparent faces 54 so as to create cavities closed from the perforations 52. Each cavity contains a transparent gas kept at a certain pressure. This gas may, for example, be air. The pressure of the air in each of the cavities is such that an optical phase shift of $\pi$ is obtained between two cavities. The pressure is, for example, fixed in one of the cavities, whereas the other is connected to a vacuum tank 56 enabling the pressure to be varied.

Other types of mode selectors may be used. For example, the selector may consist of a holographic filter embodying the selected mode LP1,j.

FIG. 6A diagrammatically represents a device according to the invention and comprising a laser provided with an intracavity mode selector and a rotating Dove prism. In the example shown, the selector 26 consists of a stretched wire; the mode LP1, 1 is thus embodied.

The means 28 to mark an orientation variation at the modal axis 15 consist of a Dove prism 58 maintained on a plate 59 suitable for driving it in rotation.

The Dove prism 58 introduces two refractions and one reflection for the beam derived from the laser 20. The efficiency of these refractions and reflections depends on the polarization of the beam. So as to render this efficiency independent of the angle of rotation, it is preferable to circularly introduce a polarized beam into the prism.

If the beam delivered by the laser 20 is polarized rectilinearly, a quarter-wave plate 60 is inserted between the laser 20 and the prism, the neutral lines of said plate being oriented 45° from the polarization direction of the beam. If the polarization of the laser is elliptic, a rectilinear polarizer (not shown) is normally added between the laser 20 and the quarter-wave plate 60.

The measurement is effected easily by rectilinearly polarizing the mode LP1,j, either parallel to the modal axis 15 or perpendicular to the latter. To this effect, a rectilinear polarizer 62 is placed between the Dove prism 58 and a focussing lens 30. This polarizer 62 revolves at an angular speed exactly twice the angular speed of rotation of the prism 58.

FIG. 6B diagrammatically represents the polarizer 62 with a polarization direction D2 orientated parallel to the modal axis 15 of a mode LP1,1. By placing a screen (not shown) at the outlet of the Dove prism, it is possible to display the modal structure TEM1,0 corresponding to the mode LP1,1. This enables the direction D1 of the polarizer 62 to be orientated parallel to the modal axis 15. The screen is obviously removed once the adjustment has been carried out.

The modal structure is rotated at an angular speed twice that of the Dove prism 58; this is the reason why the polarizer 62 is driven in rotation at an angular speed twice that of the prism 58.

FIG. 6C diagrammatically represents the polarizer 62 whose polarization direction D1 is orientated perpendicular to the modal axis 15 of a mode LP1,1. The adjustment is carried out as previously.

In this case, the rotation of the polarizer also follows the rotation of the modal structure, which ensures that the direction D1 and the modal axis are continuously perpendicular.

In the following description, FIGS. 7 and 8 diagrammatically represent the recording of a holographic filter and its use as a mode selector in a device conforming to the invention.

FIG. 7 diagrammatically represents the recording of a hologram of the mode LP1,1 on a photosensitive support 114. A fraction 103 of the luminous beam 101 emitted by the source is deflected by a semi-transparent plate 102 in the direction of the mirror 108 which redirects it towards the support 114 through the optical device 112. The fraction 105 of the beam 10 and transmitted through the plate 102 is used to synthesize a mode LP1,1 by traversing a mode selector 26 of the type described, for example, on FIGS. 4A and 4B. The optical devices 104 and 112 increase the diameter of the respective fractions 105 and 103 of the beam 101 so that the interference between these fractions 105 and 103 obtained on the support 114 generates a large hologram.

FIG. 8 diagrammatically represents the placing in rotation of the mode LP11, restored by illuminating with the aid of the source 116 the hologram firstly recorded on the support 114. The support 114 and the source 116 are fixed to each other and simultaneously placed in rotation around the axis BB. An optical system 120 makes it possible to reduce the dimensions of the modal structure produced. By means of the lens 30 (FIG. 1), it is thus possible to introduce it into the first optical fiber 10 (not shown on FIG. 8).

FIG. 9A diagrammatically represents a device conforming to the invention and using several wavelengths.

In the embodiments described above, the orientation variations of the modal axis 15 are obtained by mechanical means (rotating Dove prism, rotating mode selector, etc) by placing in rotation the modal structure TEM1,j−1 corresponding to the selected mode LP1,j. FIG. 9A represents a device using the propagation properties of the modes LP1,j inside the fibers 10, 12.

FIG. 9A diagrammatically represents a device using a tuneable laser 20 provided with a mode selector 26. This laser 20 delivers at least two specifically selected wavelengths λ 1 and λ 2 so that the power measured at the outlet of the fiber 12 is minimum for one of the wavelengths and maximum for the other wavelength. (The length of the fibers 10, 12 is fixed).

The measurement of the maximum and minimum powers makes it possible to determine the modulation amplitude; this ensures proper alignment of the fibers 10, 12 whilst obtaining the minimum amount of this parameter.

In the embodiment example shown on FIG. 9A, the modal structures are polarized by a rectilinear polarizer 29 before being introduced into the first fiber 10.

FIGS. 9B and 9C diagrammatically represent the two orientations assumed by the polarization direction of the polarizer 29. A mode LP1,1 is represented, this mode being the one most normally used.

FIG. 9B shows the rectilinear polarizer 29 having its polarization direction D3 parallel to the modal axis 15.

FIG. 9C shows the rectilinear polarizer 29 having its polarization direction D3 perpendicular to the modal axis 15.

FIG. 10 diagrammatically represents a longitudinal section of the first and second fibers 10, 12 at their connection point (the connector is not shown). This diagram shows that the fibers are not aligned perfectly: the axes RR1 and RR2 are separated by a distance d.

FIG. 11 diagrammatically represents a cross section effected at the admission side 13 of the second fiber 12. It can be seen that the axes of revolution RR1 and RR2 of the cores 10a and 12a of the fibers 10 and 12 are separated by a distance d.

This figure shows that the section inside the first fiber 10 traverses a mode LP11. The transverse profile of the modal structure extending into the fiber 10 rotates around the axis of revolution RR1 of the core 10a of the first fiber 10. The angle measuring this rotation is marked a.

FIG. 12 diagrammatically represents the variations of the luminous power of the beam 17 according to theoretical results obtained with fibers produced by the national Telecommunications Research Center (NTRC) under the reference 3364. These are monomode fibers whose characteristics are as follows: core diameter=5 micrometers; cladding diameter=105 micrometers; core number=1.464; cladding number=1.457.

The propagation mode used is the mode LP1,1.

The amplitude of the power variations during rotation is that much greater when the fibers 10, 12 are misaligned: FIG. 12 shows the curve A corresponding to a distance d of 1.5 micrometers; for the curve B, d=1 micrometer; for the curve C, d=0.5 micrometers; and for the curve E, d=0 micrometers.

These measurements thus make it possible to judge the state of alignment between the two fibers 10, 12. For example, by mechanically acting on at least one of the fibers 10, 12 by means of the connection 34 (FIG. 1), it is possible to optimize alignment with precision to within 0.01 micrometers.

Figure 13:
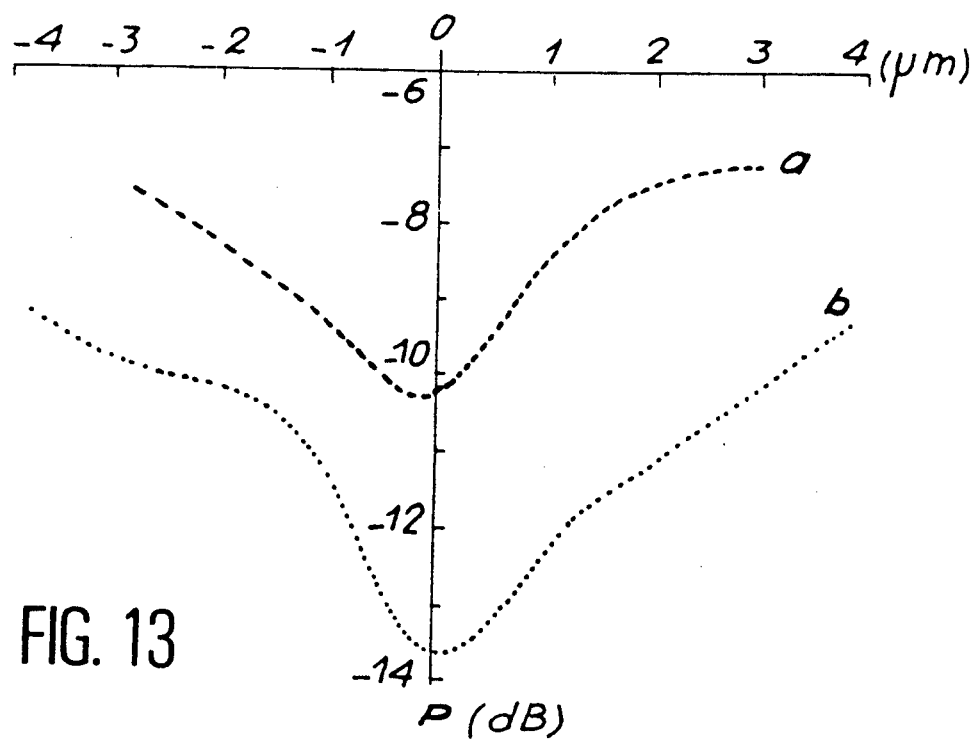

FIG. 13 diagrammatically represents the variations of the modulation depth P of the luminous power collected at the outlet of the second fiber according to the axial shift between the cores 10a, 12a of the two fibers 10 and 12 and obtained during rotation of the mode LP1,1 in the first fiber. P is defined in decibels by $$P = 10 \log \frac{P_{max} - P_{min}}{P_{max} + P_{min}}$$

The curves represented correspond to experimental results obtained with fibers produced by the NTRC under reference 3364. The curves a and b correspond to two sets of distinct measurements.

When two wavelengths λ 1 and λ 2 (FIG. 9A) are used, these wavelengths need to be selected so as to obtain $P_{max}$ and $P_{min}$. Thus, it is possible the determine the modulation depth. The alignment of the cores 10a, 12a of the optical fibers 10, 12 is adjusted by obtaining the minimum modulation depth by acting on the connection between the two fibers 10, 12.

Figure 14:
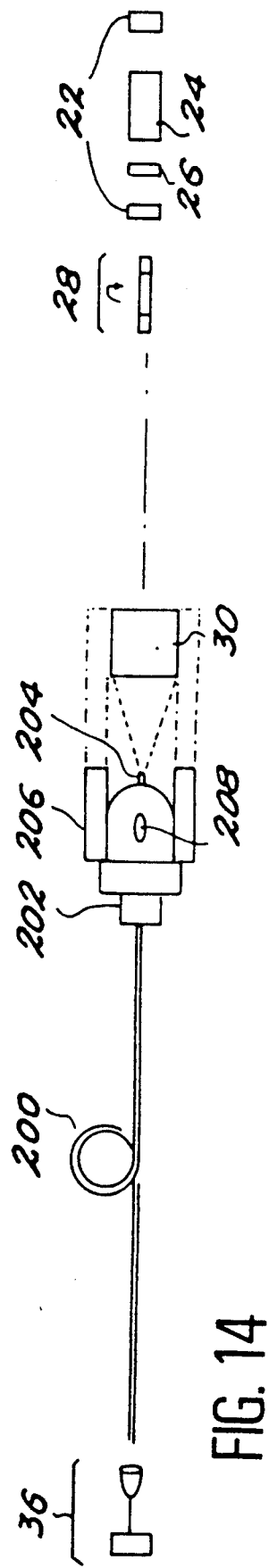

FIG. 14 diagrammatically represents a device conforming to the invention and applied to the centering of a fiber in a connection plug.

A fiber 200 is crimped in a connection plug 202. This plug may be a "straight crimping" type plug, such as the plug from the PFO series manufactured by the Radiall company. The extremity of this uncladded fiber 200 is introduced into the mobile terminal joining piece 204 of the plug 202.

This figure shows the core of the fiber 200 being centered inside the plug 202. In order to do this, the plug 202 is subjected to mechanical means 206 perfectly centered with respect to the luminous beam delivered by the lens 30. These means 206 may, for example, be a ring follower perfectly centered with respect to the rotating beam and on which the plug is screwed.

Of course, these mechanical means 206 are fixed with respect to the unit delivering the rotating modal structure. This unit has the elements previously described and bears the same references; the mode selector 26 may, for example, be a stretched wire in the cavity 22 of the laser; the means 28 to mark the orientation variations at the modal axis may, for example, be a Dove prism 58.

By using the means to measure the power 36, the power variations are measured during the orientation variations of the modal axis. By known methods for positioning the joining piece 204 (by acting on the latter by means of punches penetrating into the plug 202 via openings 208), the power variations are annulled. When the power variations are nil, the core of the fiber 200 is centered in the plug 202.

Positioned in this way, the plugs may be interconnected with minimum loss concerning the luminous signal carried.

Figure 15:
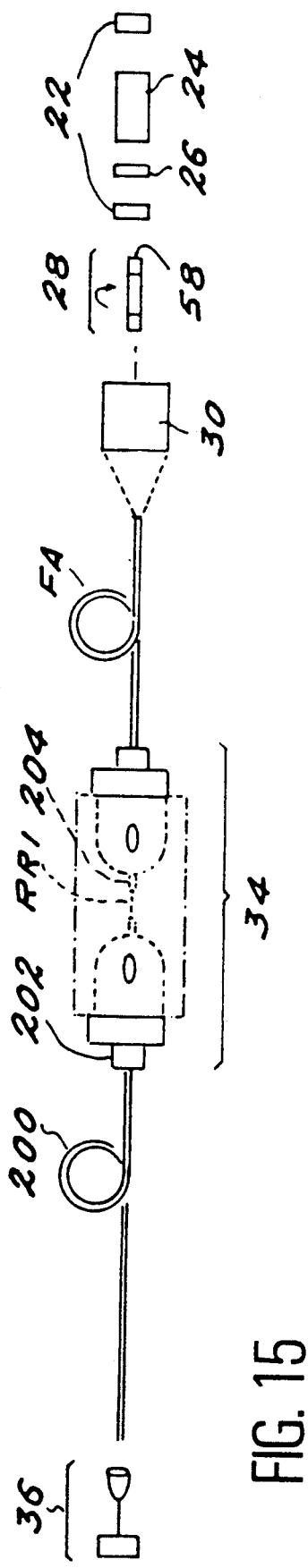

FIG. 15 diagrammatically represents an embodiment variant of a device conforming to the invention and applied to the centering of a fiber in a connection plug.

The elements already described bear the same references as mentioned earlier. An FA "leader" optical fiber is rendered integral at the unit delivering a luminous beam having a rotating modal structure. In this embodiment, the means to introduce an electromagnetic beam into an optical fiber thus comprise optical focussing means 30 and an FA "leader" optical fiber suitable for being connected to the optical fiber where it is desired to introduce the beam; this FA "leader" optical fiber is connected to at least one connection plug 202. By annulling the luminous power variations at the outlet of the FA fiber, this ensures the correct modal alignment between the luminous beam derived from 30 and the core of the FA fiber.

Then the plug borne by the FA fiber is connected to a connection plug 202 bearing a first extremity of the fiber 200 to be centered.

The means 36 measure the power variations at the other extremity of the fiber 200. By annulling the power variations by moving the joining piece 204 encompassing the fiber 200 to be centered, this ensures the modal alignment of the cores of the FA fibers and the fiber 200.

In this embodiment variant, the term centering needs to be understood as a reference positioning. In fact, with the aid of an FA 'leader" fiber whose core is not centered in the connection plug, it is possible to embody completely identical positionings of fibers inside the connection plugs. The connection between these plugs is possible without involving any signal loss, although the core of the fibers is not strictly centered in the plugs.

Of course, the core of the FA "leader" fiber may be centered in its plug with the aid of the device represented on FIG. 14. Then from this reference plug, connection plugs are embodied, the core of these plugs being perfectly centered.

This FA "leader" fiber described in this final embodiment mentioned above may certainly form part of the device of the invention as regards all the embodiment variants.

The device of the invention thus makes it possible to properly control and adjust the modal alignment of optical fibers, as well as to center a fiber in a connection plug. In this latter case, the residual centering spacings may be less than 0.1 micrometers.

What is claimed is:

1. Device to control and adjust the modal alignment of optical fibers, wherein said device includes:
    at least one laser including a cavity having a longitudinal axis and delivering an electromagnetic beam,
    at least one mode selector suitable for acting on said beam so as to produce a TEM1,j−1 type modal structure with $1 \leq j \leq n$ where n is the maximum radial sequence of an optical fiber, this modal structure having at least one axis of symmetry,
    means to mark at this axis of symmetry variations of orientation around an axis,
    means to introduce this electromagnetic beam into an optical fiber,
    means to measure luminous power.

2. Device according to claim 1, wherein said mode selector is suitable for acting on said beam so as to produce a TEM1,0 modal structure.

3. Device according to claim 1, wherein the means to mark orientation variations around an axis consist of a Dove prism supported by a plate suitable for driving this prism in rotation at a specific angular speed around said axis.

4. Device according to claim 3, wherein it further includes a rectilinear polarizer revolving at an angular speed twice the angular speed of rotation of the Dove prism, this polarizer retaining a polarization direction parallel to the axis of symmetry.

5. Device according to claim 3, wherein it further includes a rectilinear polarizer revolving around said axis at an angular speed twice the angular rotation speed of the Dove prism, this polarizer retaining a polarization direction perpendicular to the axis of symmetry.

6. Device according to claim 1, wherein the means to mark orientation variations consist of a support of the mode selector, this support being suitable for driving the mode selector in rotation around the longitudinal axis of the cavity.

7. Device according to claim 1, wherein the means to mark orientation variations consist of a support of the laser suitable for driving the laser and the mode selector rendered integral with the laser in rotation around the longitudinal axis of the cavity.

8. Device according to claim 1, wherein the means suitable for marking the orientation variations consist of:
    a tuneable laser producing a luminous beam having at least two specific wavelengths $\lambda 1$ and $\lambda 2$,
    a rectilinear polarizer with a polarization direction parallel to the axis of symmetry,
    the modal structures with wavelengths $\lambda 1$ and $\lambda 2$ introduced into a fiber whose modal alignment is to be verified, one of said structures corresponding to a measured power maximum and the other to a measured power minimum.

9. Device according to claim 1, wherein the means suitable for marking orientation variations consist of:
    a tuneable laser producing a luminous beam having at least two specific wavelengths $\lambda 1$ and $\lambda 2$,
    a rectilinear polarizer with a polarization direction perpendicular to the axis of symmetry,
    the modal structures with wavelengths $\lambda 1$ and $\lambda 2$ introduced into a fiber whose modal alignment is to be verified, one of said structures corresponding to a measured power maximum and the other to a measured power minimum.

10. Device according to claim 1, wherein it includes a rectilinear polarizer integral with the mode selector, this polarizer having a polarization direction parallel to the axis of symmetry.

11. Device according to claim 1, wherein it includes a rectilinear polarizer integral with the mode selector, this polarizer having a polarization direction perpendicular to the axis of symmetry.

12. Device according to claim 1, wherein the means to introduce the beam into an optical fiber consist of optical focussing means.

13. Device according to claim 1, wherein the means to introduce the beam into an optical fiber consist of:
   optical focussing means,
   a "leader" optical fiber suitable for being connected to the optical fiber into which the beam is introduced.

14. Device according to claim 1, wherein it further includes mechanical means for positioning a connection plug enabling the core of an optical fiber to be centered in this plug.

* * * * *